United States Patent [19]

Mohr

[11] 3,784,234
[45] Jan. 8, 1974

[54] HYDRAULIC CONNECTOR ACTUATING APPARATUS

[75] Inventor: Harvey O. Mohr, Houston, Tex.

[73] Assignee: Hydrotech International, Inc., Houston, Tex.

[22] Filed: Oct. 18, 1971

[21] Appl. No.: 189,982

[52] U.S. Cl............... 285/18, 285/93, 285/96, 285/104, 285/145
[51] Int. Cl............................ F16l 35/00
[58] Field of Search .......... 285/18, 93, 96, 97, 285/101, 104, 105, 106, 189, 190, 369, DIG. 21, 145

[56] References Cited
UNITED STATES PATENTS

| | | | |
|---|---|---|---|
| 3,713,675 | 1/1973 | White | 285/18 X |
| 3,744,822 | 7/1973 | Arnold | 285/18 |
| 3,704,033 | 11/1972 | Arnold | 285/18 |
| 3,711,123 | 1/1973 | Arnold | 285/18 |
| 3,209,829 | 10/1965 | Haeber | 285/18 |
| 3,333,870 | 8/1967 | Watkins | 285/18 |
| 3,477,746 | 11/1969 | Watson | 285/190 X |
| 3,492,027 | 1/1970 | Herring | 285/18 |
| 3,526,418 | 9/1970 | Barnett | 285/93 |
| 3,554,579 | 1/1971 | Brown | 285/18 |
| 3,598,429 | 6/1971 | Arnold | 285/18 |

Primary Examiner—Mervin Stein
Assistant Examiner—David H. Corbin

[57] ABSTRACT

A hydraulically actuatable connector having a housing adapted for positioning about a tubular member, means carried by the housing for gripping the tubular member, and a plurality of longitudinally aligned cylinders circumferentially spaced about within the housing is provided with a plurality of coaxially aligned pistons slidably positioned in each cylinder arranged to actuate the gripping means in response to a hydraulic pressure. Means are included for selectively applying a hydraulic pressure to selected ends of the pistons in each cylinder after they have actuated the gripping means into gripping engagement with the tubular member. The method includes selectively applying hydraulic fluid and hardenable hydraulic fluid to the pistons to clamp and lock the connector to the tubular member.

4 Claims, 7 Drawing Figures

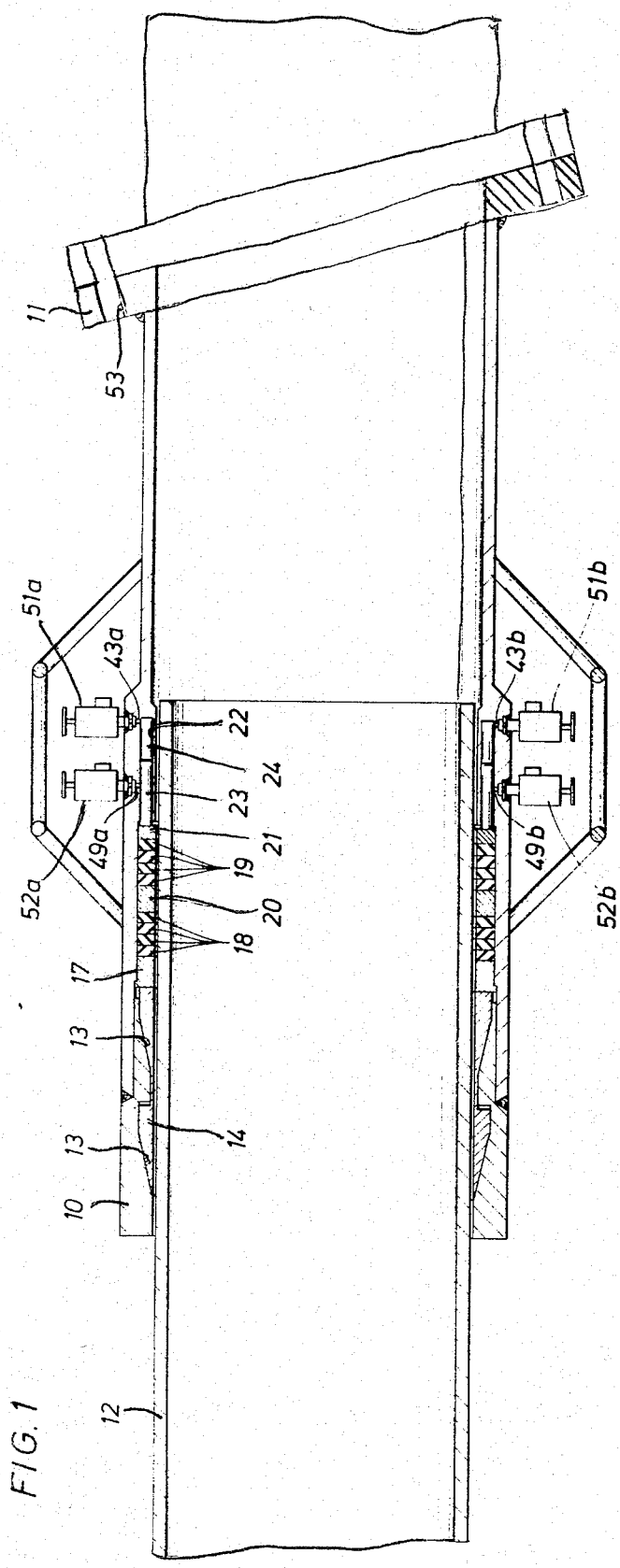
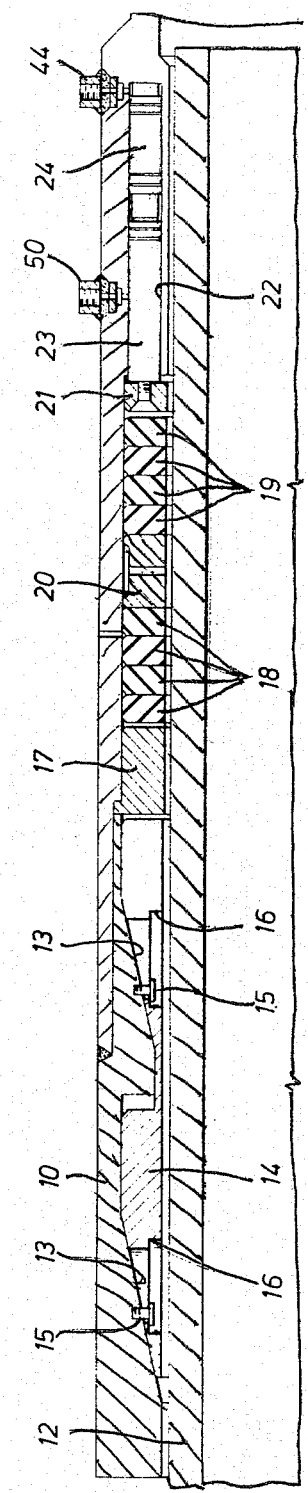
FIG. 1
FIG. 2

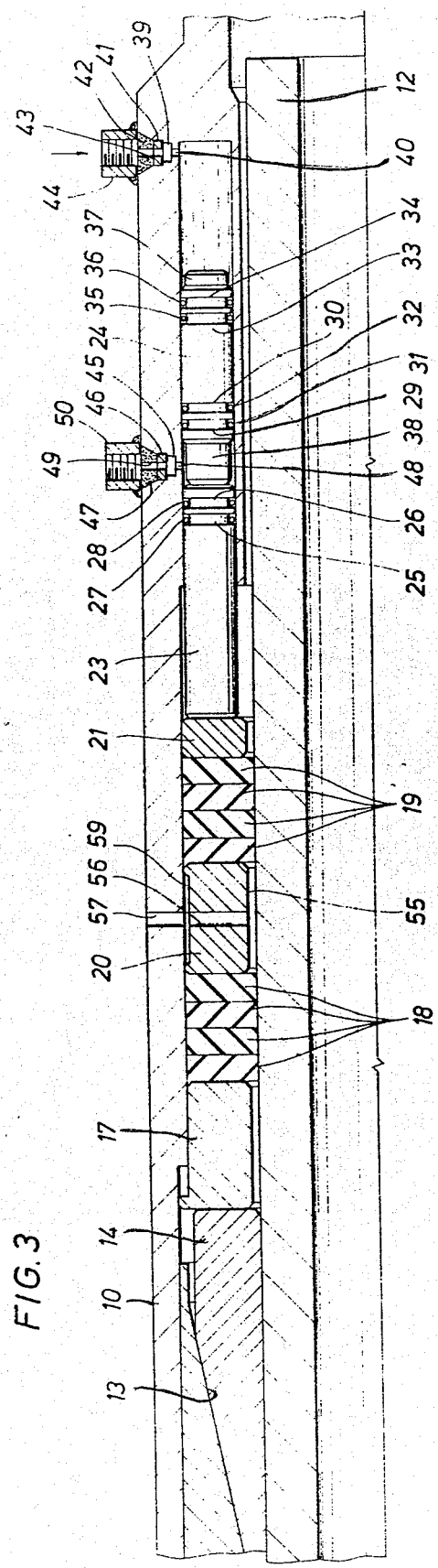
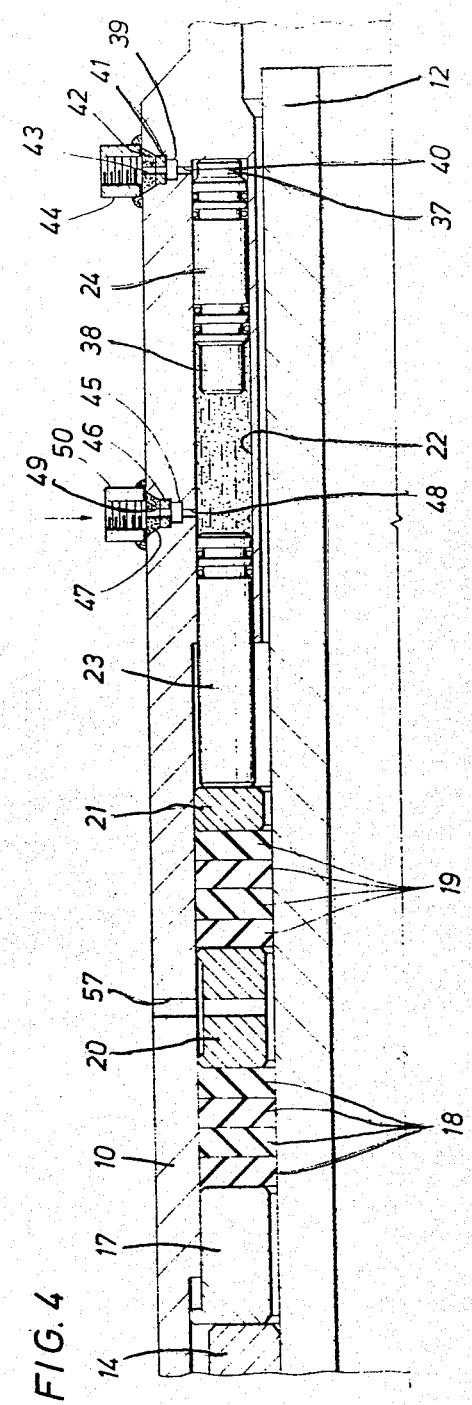
FIG.3
FIG.4

HYDRAULIC CONNECTOR ACTUATING APPARATUS

BACKGROUND OF THE INVENTION

1. Field of the Invention

Actuating apparatus and method for actuating a hydraulically actuatable connector for tubular members.

2. Description of the Prior Art

In the construction and repair of pipe lines and other tubular members in hostile environments, such as near explosive materials or under water, it has become increasingly apparent that conventional mechanical construction and welding techniques are inadequate. In response to this problem several hydraulically actuatable connectors for tubular members have been developed such as the device described in application Ser. No. 106,854 entitled Connector for Tubular Members, filed January 15, 1971, now U.S. Pat. No. 3,704,033; the device entitled Apparatus for Sealing External Surface of a Tubular Member, Ser. No. 106,726, filed Jan. 15, 1971, now U.S. Pat. No. 3,744,822; and, the device entitled Improved Connector for Tubular Members, Ser. No. 106,727, filed Jan. 15, 1971, now U.S. Pat. No. 3,713,675, each of which applications are assigned to the same assignee as the instant application.

In each of the foregoing identified connectors a generally tubular housing arranged for positioning about a tubular member is provided with a gripping means arranged for axial actuation into engagement with the tubular member and is provided with a plurality of longitudinally aligned discrete cylinders, each with a piston therein, arranged to actuate the gripping means. The cylinders are generally provided with a common manifold whereby a hydraulic fluid can be injected simultaneously into each of the cylinders and against the respective piston. Generally connectors of the foregoing type are used to provide a permanent connection and accordingly, after the connectors have been set upon the tubular member, it is desirable to purge the hydraulic fluid used for setting the connector and to replace it with a hardenable fluid such as epoxy resin that will provide a permanent connection and seal.

It has been discovered that using the prior art apparatus described above, it is frequently difficult to purge the conventional hydraulic fluid and to replace it with a hardenable liquid without unintentionally releasing the pressure on the gripping means and destroying the effectiveness of the connection. In addition, it has been discovered that occasionally a properly installed connector will begin to leak due to mechanical and hydraulic forces thereon. Accordingly, it is desirable to be able to reset the gripping means of the connector subsequent to installation. Heretofore, this resetting has been very difficult since the actuation cylinders and the manifolds interconnecting them are filled with the hardened fluid and an additional fluid cannot be forced therein.

SUMMARY OF THE INVENTION

It is therefore an object of this invention to provide an improved hydraulic connector actuating apparatus and method whereby the connector may be initially engaged to the tubular member using a conventional hydraulic fluid and this fluid then subsequently purged and replaced with a hardenable fluid without having to release the pressure from the gripping means. It is a further object of this invention to provide apparatus and method for allowing a hydraulically actuated connector which has been actuated and set with hardenable fluid to be reset should a leak arise.

The invention includes in a hydraulically actuatable connector having a housing arranged for positioning about a portion of a tubular member, means carried by the housing for gripping the tubular member upon actuation thereof and a plurality of cylinders longitudinally aligned with and circumferentially spaced about the inside of the housing, the provision of a plurality of coaxially aligned pistons slidably positioned in each of the cylinders and arranged to actuate the gripping means in response to a hydraulic pressure. Means are also included for selectively applying the hydraulic pressure to selected ends of the pistons in each cylinder when they have actuated the gripping means into engagement with the tubular member.

The method of this invention utilizes the apparatus described above, or its equivalent, and is used to actuate a hydraulically actuatable connector by applying a pressurized fluid to the end of at least one selected piston in each cylinder to move the pistons in each cylinder to the actuated position and thereby apply an actuating force to the gripping means, and subsequently applying a hardenable hydraulic fluid to other selected piston ends in each cylinder while controllably venting the hydraulic fluid previously applied.

For resetting a previously actuated connector, the method includes reintroducing a conventional pressurized hydraulic fluid or a hardenable pressurized hydraulic fluid to the proximate ends of pistons in each cylinder to force the gripping means into tighter engagement with the tubular member.

BRIEF DESCRIPTION OF THE DRAWINGS

FIG. 1 is a side elevation view, partly in section, showing one embodiment of this hydraulic connector actuator arranged for use on a bias flanged coupling.

FIG. 2 is a partial side elevation view, partly in section, showing the apparatus of FIG. 1 in greater detail and showing the actuator pistons in the initial position.

FIG. 3 is a view similar to FIG. 2, but showing the pistons in the first and third actuation positions. FIG. 4 is a view similar to FIG. 2, but showing the pistons in the second actuation position.

DESCRIPTION OF THE PREFERRED EMBODIMENT

Figure 5:
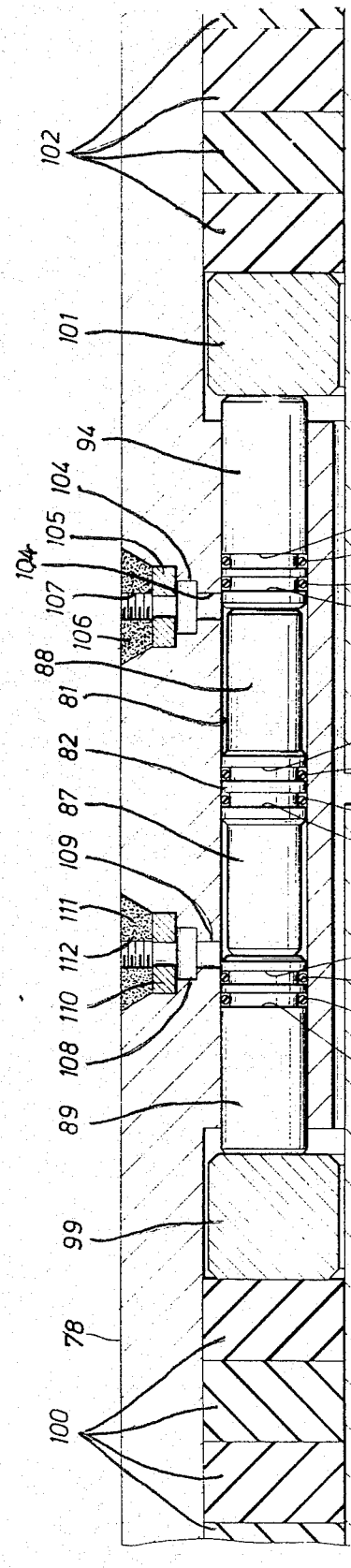
FIG. 5 is a partial side elevation view, partly in section, showing an alternate cylinder and manifold configuration.

Referring to the drawings, and particularly to FIG. 1, one embodiment of the apparatus of this invention is illustrated for use with an oversliding hydraulically actuatable pipe coupling. Referring to the drawing, a generally tubular housing 10 having a bias flange 11 thereon is overslidingly positioned about the end of a pipe 12. As viewed in FIG. 1, the inside circumference of the left end of housing 10 is provided with a plurality of inwardly facing tapered seats 13 having a plurality of slips 14 matingly slidingly positioned therein. As slips 14 move leftward, as viewed in FIG. 1, seats 13 will force slips 14 into wedging and gripping engagement between housing 10 and pipe 12, thereby securing the connector to pipe 12.

As viewed in FIG. 2, slips 14 may be retained in their unactuated position through the use of screws 15 inserted into housing 10 through slots 16 in slips 14. Although not illustrated in the figures, slips 14 are formed of a plurality of individual slips which are longitudinally aligned with housing 10 and circumferentially spaced about the inside surface thereof in seats 13.

Adjacent the rightward end of slips 14, as viewed in FIG. 1, is positioned an annular thrust ring 17 which provides means for transmitting simultaneous actuating forces to each of circumferentially spaced slips 14.

A seal in the form of a plurality of annular packer rings 18 is mounted within housing 10 adjacent the right end of thrust ring 17. Packer rings 18 are of the conventional design and are arranged to be deformed radially into sealing engagement between housing 10 and pipe 12 in response to an axially compressive force thereon.

A second set of similar packer rings 19 is provided within housing 10 and axially spaced from rings 18 by pressure test ring 20, the function of which is described below. Adjacent the rightward end of rings 19, as viewed in FIG. 1, is provided a second annular thrust ring 21.

Either seats 13 and slips 14, packer rings 18 and 19, or a combination thereof may be considered as gripping means arranged to engage pipe 12 upon actuation thereof.

The central inner circumferential portion of housing 10, as viewed in FIG. 1, is provided with a plurality of longitudinally aligned circumferentially spaced cylinders 22 bored therein, two of which cylinders are shown in FIG. 1. Cylinders 22 face leftward toward thrust ring 21.

Coaxially slidably positioned within each of the cylinders 22 is a pair of pistons 23 and 24. As seen in greater detail in FIGS. 3 and 4, the right-hand or rearward end of piston 23 is provided with a pair of annular grooves 25 and 26 in which are retained o-rings 27 and 28, respectively. Similarly, the forward or left-hand end of piston 24, as viewed in FIGS. 3 and 4, is provided with annular grooves 29 and 30 thereabout, in which grooves are positioned o-rings 31 and 32, respectively. Likewise, the rearward or right-hand end of piston 24 is provided with a pair of annular grooves 33 and 34 in which are positioned o-rings 35 and 36.

The rearward end of piston 24 is provided with an annular groove or recess 37 thereabout and the forward end of piston 24 is provided with an annular recess 38 thereabout, the function of which recesses is described below. Since pistons 23 and 24 are coaxially aligned within cylinders 22, the right-hand end of piston 23 and the left-hand end of piston 24, as viewed in FIGS. 3 and 4, will be referred to as the proximate ends of the piston pairs. And, the right-hand end of piston 24 will be generally referred to as the rearward end of the piston pair.

Means are provided for introducing a pressurized fluid into cylinders 22 at two longitudinal locations. First, at the rearward or right-hand end of cylinders 22, as shown in the drawings, a stepped annular groove 39 is cut about housing 10. Specifically, this groove lies adjacent recess 37 on piston 24 when that piston is in the unactuated or right-hand position in cylinder 22. Radial holes 40 are then bored into housing 10 from the bottom of groove 39 into each of cylinders 22. A split ring or band 41 of suitable material is then positioned within the radially outward and longitudinally wider portion of groove 39 and is welded therein by a full circumferential weld 42 thereabout. Subsequently, one or more inlet holes 43 are bored through weld 42 and ring 41 to communicate with groove 39. Holes 43 may be bored in alignment with one of holes 40, as shown, or may be provided at other desired circumferentially spaced locations about housing 10. Thereafter, an inlet fitting 44 is welded to housing 10 adjacent each of holes 43.

A second similar inlet means is provided generally longitudinally centered along cylinders 22. The proper position of this inlet is described in detail below. This inlet means similarly includes a stepped annular groove 45 having a split ring or band 46 positioned in the radially outward portion thereof and retained therein by weld 47. Radial holes 48 communicate between each of cylinders 22 and the lower portion of groove 45, and one or more inlet holes 49 are bored through weld 47 and split ring 46 to communicate with groove 45. An inlet fitting 50 is welded to housing 10 adjacent each of holes 49.

For proper hydraulic fluid flow it is preferable that at least two paths of communication in the form of two diagonally opposing holes 43a, 43b, and 49a, 49b be provided to each of grooves 39 and 45, as shown in FIG. 1. Fittings 44 and 50 may be provided with corresponding diagonally opposing valves 51a and 51b and 52a and 52b, respectively, as shown in FIG. 1, which valves are utilized to control the flow of hydraulic fluid to and from the connector.

An alternate cylinder and manifold arrangement suitable for use with the connector of FIGS. 1–4 is illustrated in partial cross section in FIG. 5. In this embodiment, each of the actuation cylinders is formed as a discrete cylinder 60 and is secured within housing 10 by weld 61. Instead of using a machined circumferential groove and radial holes to provide external communication with cylinders 60, the cylinders of this embodiment are provided with tapped holes and a separately mounted manifold.

The right, or closed, end of each of the cylinders 60, as viewed in FIG. 5, is provided with a tapped hole 62 into which is threaded a through-bored fitting 63. Attached to each of fittings 63 is a tubular manifold pipe 64 arranged to communicate therewith and arranged to communicate to the outside of housing 10 through pipe 65 which is positioned in hole 66 in housing 10.

Adjacent the longitudinal midpoint of cylinder 60, in the position described below with reference to stepped groove 45, housing 10 is provided with through-bore holes 67. Cylinders 60 are each provided with a tapped hole 68 adjacent hole 67 and an inlet pipe 69 is threaded therein. Pipes 69 are externally interconnected by a manifold pipe (not shown).

In the operation of the above described coupling, housing 10 is slidingly positioned over the end of tubular member 12 and is attached to another member (not shown) as desired by placing bolts through the holes 53 in flange 11. A source of pressurized hydraulic fluid is then connected to one of valves 51a and 51b and that valve is opened to allow introduction of the pressurized fluid into cylinder 22 adjacent the right or rearward end of piston 24. The other of valves 51a and 51b may be slightly opened to allow evacuation of any air trapped within cylinder 22. After air in cylinder 22 is purged, the evacuation valve is closed and continued introduction of pressurized hydraulic fluid into cylinder 22 will cause pistons 23 and 24 to move leftward, thereby forcing thrust ring 21 leftward. Accordingly, packer rings 18 and 19 and test ring 20 will move leftward causing slips 14 to react against slip seats 13 and forcing slips 14 into gripping engagement between housing 10 and pipe 12. Continued pressurization behind piston 24 will compress packer rings 18 and 19 between thrust rings 17 and 21 and continue the leftward or forward movement of pistons 23 and 24. At this time the connector will assume the configuration shown in FIG. 3.

As slips 14 are set and packer rings 18 and 19 are compressed, pressure test ring 20 moves leftward, as shown in FIG. 3. Pressure test ring 20 is provided with an external annular groove 59 thereabout and an internal annular groove 55 therein. A plurality of circumferentially spaced holes 56 are radially bored through ring 20 and to allow communication of a test fluid between grooves 59 and 55. Housing 10 is provided with one or more radially extending holes 57 therethrough which are positioned to register opposite groove 59 when the apparatus is in an actuated position as shown in FIG. 3.

After this initial actuation of the apparatus, a pressure test fluid, such as air, hydraulic fluid or epoxy, may be injected through one of holes 57. If packer rings 18 and 19 are properly seated between housing 10 and pipe 12, there will be no escape of the test fluid from the area of test ring 20. A preferrred manner of making this test is to inject a pressurized oil or epoxy through hole 57 and monitoring the pressure of this fluid for a short period of time to determine whether there are pressure changes. Similarly, if a hydraulic fluid is injected through hole 57 into the test ring 20, a visual inspection could be made at each end of housing 10 adjacent pipe 12 to determine if any fluid is leaking.

Assuming proper seating of slips 14 and packer rings 18 and 19, the actuation procedure may be continued. At this time, a pressurized hydraulic fluid may be introduced through fitting 50 and hole 49 to annular groove 45. Groove 45 is located on housing 10 so that it will register adjacent front recess 38 on piston 24 when the pistons are in the actuated position, as shown in FIG. 3.

As a pressurized hydraulic fluid is introduced through fitting 50 to the proximate ends of pistons 23 and 24, the pressurized fluid previously introduced through fitting 44 is controllably vented from cylinder 22 through fitting 44. The fluid introduced through fitting 50 will operate on the rearward portion of piston 23 and the forward portion of piston 24 and will maintain the position of piston 23 while forcing piston 24 rearward and evacuating the hydraulic fluid therebehind. The apparatus will then assume the configuration shown in FIG. 4.

Next, if it is desired to install a connector apparatus permanently, a hardenable hydraulic fluid, such as an epoxy resin, may be introduced through fitting 44 into cylinder 22 behind piston 24. As this fluid is introduced, the fluid contained in cylinder 22 between the proximate ends of pistons 23 and 24 is now controllably vented through fitting 50. By maintaining a back pressure upon the latter fluid, piston 23 is retained in its actuated position while piston 24 is gradually forced leftward into contact with piston 23. The apparatus then again assumes the position shown in FIG. 3 with the area in cylinder 22 behind piston 24 filled with an epoxy resin which is allowed to harden under pressure.

The connector is now permanently installed. However, should slips 14 or packer rings 18 or 19 dislodge slightly due to mechanical or hydraulic stresses, they may be reset by injecting a hydraulic fluid through fitting 50 and against the proximate end of pistons 23 and 24. Since piston 24 cannot move rearward due to the hardened epoxy therebehind, piston 23 is forced leftward and causes resetting of slips 14 and resetting of packer rings 18 and 19.

If desired, when the connector is permanently installed a hardenable hydraulic fluid such as epoxy resin may be introduced into test ring 20 through hole 57, thereby providing an additional seal between housing 10 and pipe 12. If epoxy resin has been injected into ring 20 during original installation and it becomes necessary to reset the packer rings and slips as described above, it has been discovered that the resetting pressure from piston 23 is sufficient to break the seal of the epoxy resin about test ring 20 and to allow slips 14 and packer rings 18 and 19 to move leftward, as described above.

Figure 6:
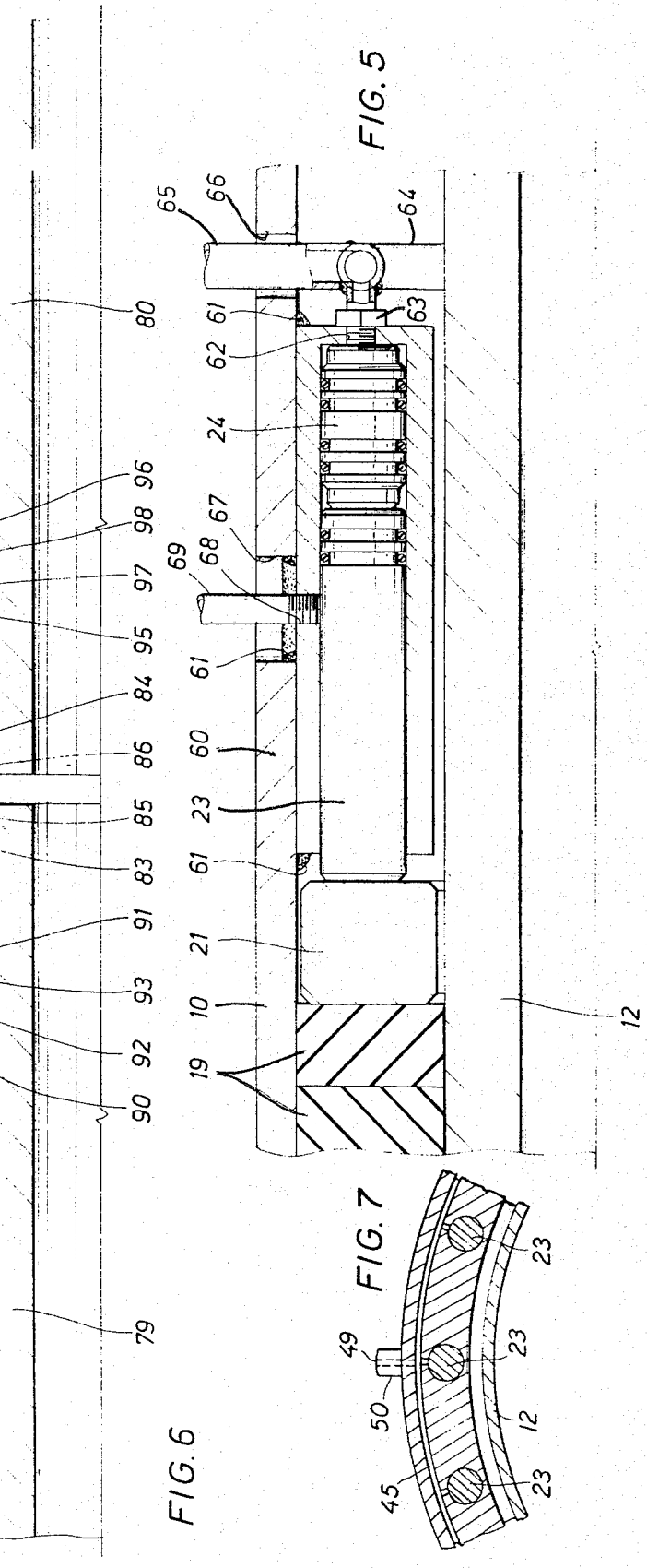
FIG. 6 is a partial side elevation view, partly in section, showing a multiple piston arrangement suitable for actuation of a double acting hydraulic connector.
Figure 7:
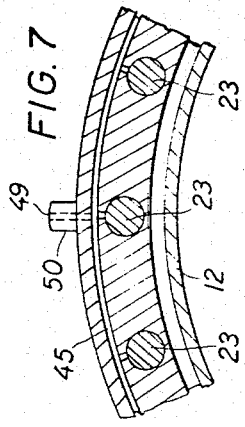
FIG. 7 is a partial cross-sectional view of pistons 23 as shown in FIG. 1 showing the arrangement of the circumferentially spaced cylinders and pistons and the fluid communication means therewith.

An alternate embodiment of the apparatus of this invention, suitable for use in a coupling having double acting packers and slips, is partly shown in partial cross section in FIG. 6. In this embodiment a cylindrical housing 78, the cross section of one-half of which is shown in FIG. 6, is slidingly positioned over the adjacent ends of coaxial pipes 79 and 80 which are to be coupled. Housing 78 is provided with a plurality of longitudinally aligned circumferentially spaced cylinders 81 bored therein. When this coupling is in its unactivated position, shown in FIG. 6, there is centrally disposed within cylinder 81 an axially slidable shuttle piston 82 having circumferential slots 83 and 84 generally centrally disposed thereabout, with o-rings 85 and 86 provided therein. The left and right-hand ends of piston 82, as viewed in FIG. 6, are provided with annular recesses or grooves 87 and 88, respectively, thereabout.

Adjacent the left end of piston 82, as viewed in FIG. 6, there is provided a second axially slidable piston 89 within cylinder 81. This piston is similarly provided with o-ring grooves 90 and 91 at the right-hand end thereof, which grooves have o-rings 92 and 93, respectively, provided therein.

Similarly, adjacent the right-hand end of piston 82 is provided a third piston 94 slidably positioned within cylinder 81. Likewise, this piston is provided with o-ring grooves 95 and 96 having o-rings 97 and 98, respectively, positioned therein. Adjacent the left end of piston 89, as viewed in FIG. 6, is provided an annular thrust ring 99 arranged to evenly distribute a force from piston 89 to radially deformable packer rings 100 positioned adjacent ring 99. Similarly, adjacent the right end of piston 94 is provided a thrust ring 101 arranged to evenly distribute forces from piston 94 to annular packer rings 102 located adjacent ring 101.

Although not shown in the drawing, adjacent packers 100 and 102 of FIG. 6 would be provided slips such as slips 14 shown in FIGS. 1–4, arranged to slidingly mate with slip seats in the housing and to be actuated into gripping engagement with pipes 79 and 80, respectively. If desired, a pressure test ring, such as ring 20 shown in FIGS. 1–4, could be provided intermediate the ends of each of packers 100 and 102. Either packers 100 and 102 or the adjacent slips and seats (not shown) or a combination thereof may be considered as gripping means arranged to engage pipes 79 and 80 upon actuation thereof.

Referring now to the portion of housing 78 adjacent the junction of pistons 82 and 94, there is provided a manifold and actuation system. This system is constructed by first machining a stepped groove 103 about housing 78. Thereafter, radial holes 104 are bored from the bottom of groove 101 into each of cylinders 81. A suitable closure band or strip 105 is then placed within the upper portion of groove 103 and is securely welded therein by a full circumferential weld 106. In at least one, but preferably in at least two circumferentially spaced positions about housing 78, there is bored a pressure inlet hole 107 arranged to communicate with the lower portion of groove 103.

Similarly, referring to housing 78 adjacent the intersection between pistons 82 and 89, there is provided a second manifold and actuation assembly. This assembly is constructed in a manner similar to that described above and includes an annular stepped groove 108 with holes 109 bored from the bottom thereof into each of cylinders 81. A metallic closure strip or band 110 is secured within the upper portion of groove 108 by weld 111 and actuation inlet holes 112 are subsequently bored therein. While not illustrated in FIG. 6, this embodiment could use a discrete manifold and inlet arrangement similar to that shown and described with reference to FIG. 5, above.

In operation the actuation system of this latter embodiment performs the same function as that performed by the FIGS. 1-4 embodiment above. That is, it is arranged so that the initial actuation fluid for the coupling may be flushed or purged and replaced with a second fluid, and the coupling may be subsequently reset at a later time, if desired. To actuate the coupling of FIG. 6, an initial actuation fluid, such as a hydraulic fluid, is injected into one of inlet ports 107 and 112. As an example, if the hydraulic fluid is injected into port 107, the pressure of this fluid will cause piston 94 to move rightward and pistons 82 and 89 to move leftward, as seen in FIG. 6. This piston movement will cause thrust rings 99 and 101 to act upon packers 100 and 102, respectively, and upon any slips and ancillary coupling elements adjacent packers 100 and 102. This outward movement of the pistons from port 107 will axially compress and radially deform packers 100 and 102 into sealing engagement between housing 78 and pipes 79 and 80, respectively.

After this initial actuation through port 107, an actuation fluid or a hardenable epoxy resin fluid may be injected through port 112 while the initial actuation fluid is controllably vented through port 107. This purging of the initial fluid and replacement by epoxy can be attained without releasing the actuation forces upon the packers. Thus, when the connector is finally energized, piston 89 will be leftward of the position shown in FIG. 6 while pistons 82 and 94 will be rightward of that position, and packers 100 and 102 will be axially compressed. If it should be determined at a subsequent time that resetting of the packers or slips is required, then resetting fluid, either a hydraulic fluid or an epoxy resin, may be reapplied through port 107 to cause an actuation force to be exerted upon the adjacent ends of pistons 82 and 94, thereby forcing them apart. As was mentioned with reference to FIGS. 1–4 above, it has been determined that the force of this resetting fluid is sufficient to cause the epoxy link between the epoxy in recess 87 and the epoxy in hole 109 to be sheared off, allowing pistons 89 and 82 to be moved leftward freely.

The method of this invention is suitable for use on a variety of hydraulically actuatable connectors, such as those prior art connectors described above. In those devices, the plurality of longitudinally aligned circumferentially spaced actuation cylinders are each provided with a single actuation piston. As a result, when those connectors are set initially with a conventional hydraulic fluid and it is desired to purge that fluid and replace it with a hardenable fluid, it is difficult to maintain a constant compression force upon the packer rings and slips. In addition, it would be very difficult to reset the prior art devices, should a leak occur, since the only inlet to the actuation cylinders is filled with a hardened epoxy. These problems are alleviated using the instant method.

Connectors suitable for utilizing the method of this invention are illustrated in the FIGS. and have been described above. Referring first to FIGS. 1–4, each of the cylinders is provided with a pair of coaxially aligned actuation pistons 23 and 24 and two axially spaced apart hydraulic fluid inlets 44 and 50.

In a first embodiment of this method, housing 10 is slidably positioned over the end of pipe 12 and a conventional hydraulic fluid is introduced through fitting 44, thereby forcing pistons 23 and 24 leftward and setting slips 14 and packer rings 18 and 19. The efficiency of packer rings 18 and 19 may then be tested by injecting a pressurized fluid through hole 57, as described above. Assuming proper seating of the slips and packer rings, a pressurized hardenable hydraulic fluid, such as epoxy resin may then be injected through fitting 50 while the previously introduced hydraulic fluid is controllably evacuated from cylinder 22 through fitting 44.

A second and preferred method of this invention, using the apparatus of FIGS. 1–4 or its equivalent, includes the initial step of injecting a conventional pressurized hydraulic fluid through fitting 44 to force pistons 23 and 24 leftward and to set slips 14 and packer rings 18 and 19. After the seal of packer rings 18 and 19 is tested and confirmed, a conventional hydraulic fluid is then introduced through fitting 50 while the previously introduced hydraulic fluid is controllably vented through fitting 44, allowing piston 24 to return to its rightward position and maintaining piston 23 in its leftward position, as shown in FIG. 4. Then a hardenable hydraulic fluid such as epoxy resin is introduced through fitting 44 and the hydraulic fluid between the proximate ends of pistons 23 and 24 is vented through fitting 50, allowing the apparatus to assume the position shown in FIG. 3. This method may also include the step of subsequently introducing a conventional or a hardenable hydraulic fluid through fitting 50 and against the proximate ends of pistons 23 and 24 to provide additional pressure upon slips 14 and packer rings 18 and 19 if they are loosened in service and must be reset.

A similar method pertains when using the apparatus of FIG. 6 or its equivalent. The initial step includes injecting a pressurized hydraulic fluid through either of inlets 107 or 112, to cause pistons 89 and 94 to exert an axial setting force upon packers 100 and 102. After the seal of the packers is tested and confirmed, a hardenable hydraulic fluid, such as epoxy resin, is introduced through the other of inlets 107 and 112 while the original setting hydraulic fluid is controllably vented through the inlet first used to introduce that fluid. During this second step, shuttle piston 82 will move axially from its position adjacent the second inlet to a position adjacent the first inlet. Similarly, this method may also include the step of subsequently introducing a conventional or a hardenable hydraulic fluid through the first above used inlet to cause an additional setting force to be applied to packers 100 and 102 if they have become loosened in service or otherwise require resetting.

Further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiments. Various changes may be made in the shape, size and arrangement of parts. For example, equivalent elements, materials, or steps may be substituted for those illustrated and described herein, parts may be reversed, and certain features of the invention may be utilized independently of the use of other features, all as would be apparent to one skilled in the art after having the benefit of this description of the invention.

What is claimed is:

1. In a hydraulically actuatable pipe connector for making a connection to a pipe, the combination comprising:
    a housing arranged for positioning about the outside surface of said pipe to which connection is to be made;
    said housing having means for forming therein a plurality of circumferentially spaced longitudinally aligned cylinders;
    means supported by said housing and axially spaced from the ends of said cylinders for gripping said pipe upon actuation thereof in response to an axial force applied thereto;
    at least two individually discrete co-axially aligned and axially separable pistons slidably mounted in each of said cylinders, such that said two pistons have two axially proximate ends and two axially spaced apart ends, with at least one of each of said two pistons being positioned to provide axial actuation force to said gripping means;
    first pressurized fluid conduit means provided in said housing for communicating with that one end of said axially spaced apart ends of each of said two pistons which is spaced farthest from said gripping means;
    second pressurized conduit means communicating with said proximate ends of each of said two pistons; and means positioned between each of said pistions and the cylinder in which each is mounted for forming a pressure tight seal therewith;
    whereby initial application of pressurized fluid to one of said conduit means urges at least one of each of said two pistons axially to thereby provide said actuation force to said gripping means, and subsequent application of pressurized fluid to said other conduit means purges the initial actuating fluid from said cylinders while maintaining said gripping means in the actuated position.

2. The invention as claimed in claim 1 including:
a third individually discrete piston slidably mounted in each of said cylinders, with said third piston each being co-axially aligned with said first two pistons and responsive to pressurized hydraulic fluid applied through one of said conduit means.

3. The invention as claimed in claim 1 wherein:
each of said pistons is provided with at least one annular radially outwardly facing groove thereabout;
and, said sealing means being positioned in each of said outwardly facing grooves for forming a pressure tight seal between said pistons and said cylinders.

4. The invention as claimed in claim 2 wherein:
the intermediate one of said three pistons in each of said cylinders is provided with a longitudinal portion on each end thereof of reduced diameter,
and wherein each one of said conduit means communicates with an end of said intermediate piston.

* * * * *